United States Patent
Gelblum

[15] 3,653,829
[45] Apr. 4, 1972

[54] RECOVERY OF SULFUR VALUES FROM BRINE

[72] Inventor: Gideon P. Gelblum, Philadelphia, Pa.
[73] Assignee: Catalytic Construction Company, Philadelphia, Pa.
[22] Filed: Jan. 29, 1970
[21] Appl. No.: 6,760

[52] U.S. Cl..................................23/181, 23/42, 23/200, 23/201
[51] Int. Cl..................................C01b 17/16, C01b 5/22
[58] Field of Search..............23/42, 90, 122, 181, 200, 201

[56] References Cited

UNITED STATES PATENTS

| | | | |
|---|---|---|---|
| 1,529,435 | 3/1925 | Jahl | 23/181 |
| 1,936,849 | 11/1933 | Mertes | 23/90 |
| 1,979,595 | 11/1934 | Wood | 23/200 X |
| 2,191,411 | 2/1940 | Pierce, Jr. | 23/42 |
| 2,195,917 | 4/1940 | Clifford | 23/90 |
| 2,359,829 | 10/1944 | Day | 23/201 X |
| 2,479,138 | 8/1949 | Scoles | 23/201 |
| 2,605,167 | 7/1952 | O'Brien | 23/201 |
| 3,467,494 | 9/1969 | Posego | 23/181 X |
| 3,547,579 | 12/1970 | Pechenick et al. | 23/181 X |

FOREIGN PATENTS OR APPLICATIONS 345,873  4/1931  England..................23/181

*Primary Examiner*—Oscar R. Vertiz
*Assistant Examiner*—Charles B. Rodman
*Attorney*—B. Max Klevit and Barry Moyerman

[57] ABSTRACT

Sulfur values are recovered, from a brine comprising sulfate ion, by contacting the brine with a brine-soluble barium compound in a direct reaction. A $BaSO_4$ precipitate results and this precipitate is separated, dried and calcined in a reducing atmosphere to convert it to BaS. The depleted brine may be either discarded or subjected to further treatment with a brine-soluble barium compound for recovery of metals therefrom. The BaS obtained from the process may then be treated in a variety of ways all of which have as their objective displacement of the sulfur, as $H_2S$, which may be directly recovered or converted to products such as sulfur and sulfuric acid. The various treatments disclosed provide for recycle of the barium ion into the initial phases of the process. Some of them, additionally, permit recovery of particular metal oxides or metal hydroxides from the brine as well as conversion of alkali metals and alkali earth metal halides to their hydroxides or carbonates.

9 Claims, 7 Drawing Figures

Patented April 4, 1972 3,653,829

GIDEON P. GELBLUM INVENTOR.

BY

Patented April 4, 1972

GIDEON P. GELBLUM INVENTOR.

BY Barry Moyerman

RECOVERY OF SULFUR VALUES FROM BRINE

BACKGROUND OF THE INVENTION

1. Field of the Invention

This invention relates to the treatment of natural and synthetic brines. More particularly, it relates to the treatment of sulfate-containing brine for the recovery therefrom of its sulfur values as well as certain metals which it may contain.

2. Prior Art

The recovery of minerals from brines has been the subject of many prior patents. A few of these have utilized a recycled barium-containing material for recovery of sulfur values. Common to these patents is the formation of an insoluble $BaSO_4$ followed by its calcination, in a reducing atmosphere, to yield BaS.

For example, in U.S. Pat. No. 3,378,336 sulfate-bearing brine is contacted with an ion exchange resin, in barium form, to precipitate the sulfate as $BaSO_4$ and convert the resin to an alternate metal form. The BaS, formed from the $BaSO_4$, is ultimately used as the basis for converting the resin back to its barium form so that it can be recycled.

Another use of barium materials is disclosed in U.S. Pat. Nos. 2,191,411 and 3,107,142, both of which disclose the reaction of insoluble barium carbonate with a sulfate-containing liquid to yield an insoluble precipitate of $BaSO_4$. The latter patent further discloses reduction of $BaSO_4$ to BaS, followed by its reaction with carbonic acid to form $H_2S$ and $BaCO_3$. The $BaCO_3$ is filtered and recycled for use in the process.

Quite aside from cost, ion exchange systems of the type described above are subject to sulfate blinding, are sensitive to the concentration of dissolved sulfates and, in general, are complex systems which present problems in maintenance of equilibrium.

The prior art barium carbonate systems have disadvantages including relatively long reaction times (e.g. several hours) resulting from the immiscibility of the barium carbonate in neutral or alkaline solutions.

There is also some prior art with respect to the direct reaction of barium chloride and a sulfate-containing brine. However, such reactions have been performed on a once-through basis and have thus been reserved for a final polishing of depleted brine with no attempt made to recover any of the barium values.

Barium hydroxide, which is a common and excellent water treatment reagent, is rarely used in brine treatment because of its high cost and relative scarcity. When it is used, the amounts involved are so small that no complicated recovery system is economically warranted.

SUMMARY OF THE INVENTION

The present process is based on the direct reaction of a sulfate-bearing brine and a soluble barium compound to produce a $BaSO_4$ precipitate which is calcined in a reducing atmosphere, preferably in a fluidized bed, to yield BaS. The BaS is treated, in any one of a number of modifications, to displace the sulfur as $H_2S$ so that it can be recovered. Processes which can be used to effect this displacement include, for example, hydrolysis, chlorine-base exchange and carbonation. The barium values are recovered from the BaS and converted to the brine-soluble form necessary as an initial reactant for operation of the specific process being used.

The invention is capable of a wide number of embodiments involving novel combinations of novel and conventional unit processes and unit operations. It is therefore believed a prerequisite to a firm grasp of the essential inventive concept to understand the nature and function of the unit processes and operations which are involved since they are the building blocks utilized, in a variety of arrangements, to effect an economically viable process for recovery of sulfur values and metals from brine. Accordingly, these unit processes and operations will be discussed below:

A. Carbonate Removal

Brine suitable for use in the process may contain $CO_3$. In order to prevent the subsequent undesired formation of $BaCO_3$ (i.e. in those process modifications which do not themselves involve the formation of $BaCO_3$), it is necessary to eliminate this $CO_3$. Were unwanted $BaCO_3$ to form it would limit formation of $BaSO_4$. This may be done, conventionally, by acidifying the brine to a pH of less than 6 using strong mineral acids (e.g. HCl) and, thereafter, stripping the resulting $CO_2$ from the brine with air in a stripping column. The evolved $CO_2$ may be discarded or subsequently utilized. Since temperature accelerates the dissociation of carbonic acid, and also decreases the solubility of $CO_2$ in water, stripper temperatures of from about 40° C. to about 90° C. are preferred.

B. Reaction with Barium Compound $SO_4^=$ is removed by a metathetical reaction of a barium compound, which is soluble in the brine, and the $SO_4^=$ therein to obtain barium sulfate as a precipitate. The reaction may be represented by the equation:

$$Ba^{++} + SO_4^= \rightarrow \underline{BaSO_4}$$

The barium compounds used, in various modifications of the invention, include the chloride, bicarbonate and hydroxide.

The reaction is preferably performed in a well agitated reactor crystallizer (preferably cascaded) at temperatures between 40° and 90° C. A slightly acidic environment (e.g. a pH of less than 6) and a local excess of $Ba^{++}$ are preferred conditions, since these promote the growth of larger $BaSO_4$ particles.

C. Separation of $BaSO_4$ from Depleted Brine

The suspended $BaSO_4$ is removed from the reactor effluent slurry in a clarifier or filter to yield a sulfate-free brine. Additional subsequent polishing, to remove even the finest $BaSO_4$ particles, can be performed with a fine filter.

D. Drying of $BaSO_4$ $BaSO_4$ is dewatered and/or dried to less than 5 percent moisture. This can be done mechanically in a centrifuge or filter and/or by counter-current contact with hot flue gas in a conventional dryer. In general it is preferred to follow the drying with a pelletizing operation to produce pellets of $BaSO_4$ having a diameter of from 1 to 6 mm.

E. Calcining

Calcining is utilized to effect the conversion of $BaSO_4$ to BaS. This is done in a reducing environment utilizing for example a reducing gas such as synthesis gas, $H_2$, light ends or $CH_4$. The particular reaction with synthesis gas can be represented by the equation:

$$BaSO_4 + (4-a)CO + aH_2 \rightarrow BaS + (4-a)CO_2 + aH_2O$$

wherein a is a numeral from 0 to 4, which is a function of the temperature at which the reaction is conducted. Other suitable reducing materials include charcoal or coal, in which case the reaction may be represented by the equation:

$$BaSO_4 + 2C \rightarrow BaS + 2CO_2$$

The equipment utilized is preferably a fluidized bed reactor, where a gaseous reducing medium is used for fluidization. Where a solid carbonaceous material is used, a rotary kiln is conveniently employed. The term reducing atmosphere as used herein is intended to encompass both situations.

The reducing temperature, depending on the reducing medium, is in the range of 800° - 1,200° C., preferably between 1,100° and 1,175° C. It is preferred to separately preheat the reactants to the calcining temperatures prior to the calcination.

F. Treatment of BaS

BaS is treated to displace the sulfur and yield $H_2S$. It is at this point of the process that several alternative embodiments are available depending on the desired end products.

1. Hydrolysis

The BaS is hydrolyzed to yield $H_2S$ and $Ba(OH)_2$. Several possibilities exist as to the particular hydrolysis process used under given circumstances. The first hydrolysis process which can be used involves a reaction of barium sulfide with steam at a temperature of about 1,000° C., preferably in the presence of hydrogen, to yield solid BaO and gaseous hydrogen sulfide. The BaO, in turn, can either be reacted with steam at temperatures less than 400° C. to yield a solid $Ba(OH)_2$ or alternatively, can be hydrated in liquid phase with water to yield a solution of $Ba(OH)_2$.

An alternate processing scheme would react the solid barium sulfide with steam at temperatures less than 200° C. in the presence of hydrogen to yield a hydrate of barium hydroxide, most probably an octahydrate, and evolve $H_2S$. The barium hydroxide hydrate can, in turn, be dissolved in water to form a barium hydroxide solution.

In one version of the process the $Ba(OH)_2$ must first be converted into $BaCl_2$ by a process which will be referred to herein as "oxi-chlorination." In still another version of the process it is reacted with the sulfate-free brine of operation [C] above as part of a metal recovery process. These two variants will now be discussed.

a. Oxi-Chlorination

The $Ba(OH)_2$ solution resulting from the hydrolysis is reacted at a temperature of from 20° to 100° C. with a recycle solution of $BaCl_2$ and an alkali metal hydroxide (e.g. NaOH) in proportions such that there is a 50 percent excess of hydroxide (i.e. $OH^-$) and $Ba^{++}$ over the $Cl^-$ and alkali metal ions, respectively. A precipitate of barium oxychloride ($Ba(OH)(Cl)$ or basic barium chloride) is obtained and the mother liquor is sent to an alkali metal oxide or hydroxide recovery system (e.g. an NaOH recovery system) from which excess $Ba(OH)_2$ is recycled to the front of the process. The $Ba(OH)(Cl)$ precipitate is dissolved in an aqueous alkali metal chloride (e.g. NaCl) to yield an equilibrium solution of $BaCl_2$ and NaOH and a precipitate of $BaCl_2$, which is removed by filtration. The filtrate is the aforementioned recycle solution, which is reacted with the $Ba(OH)_2$ solution resulting from hydrolysis. The $BaCl_2$ is recovered and utilized as the barium compound in step [B] above.

b. Oxi-Demetalizing Treatment of Brine

In situations where it is desired to recover metal values from the depleted brine, the $Ba(OH)_2$ solution is not subjected to oxi-chlorination. Instead, it is reacted with the depleted brine under conditions which yield a metallic precipitate. Brines which contain copper, iron, aluminum, calcium, magnesium and/or strontium may be treated in this manner to recover the metals. The reaction, for example, in the case of magnesium may be represented by the equation:

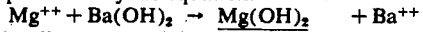
$$Mg^{++} + Ba(OH)_2 \rightarrow Mg(OH)_2 + Ba^{++}$$

The mother liquor, containing the barium ion, is then utilized as the barium reactant in step [B].

2. Carbonation

The carbonation of the solid barium sulfide is best effected by reacting it, as a hot solid, with a mixture of steam and carbon dioxide. The reaction proceeds according to the equation:

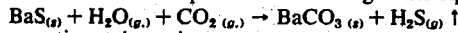
$$BaS_{(s)} + H_2O_{(g)} + CO_{2(g)} \rightarrow BaCO_{3(s)} + H_2S_{(g)} \uparrow$$

The reaction takes place at any temperature below that at which the $BaSBaCO_3$ eutectic forms, preferably below 800° C. Conventional equipment can be utilized such as, for example a rotary kiln but it is preferred to use a fluidized bed reactor. Regardless of equipment utilized, the reacting gas mixture is introduced at a temperature low enough to absorb the exotherm of the reaction and to keep the reaction temperature within the above-stated limits.

The reaction can, alternatively, be performed in an aqueous solution using, for example, an agitated reactor through which pressurized $CO_2$ is swept to come into intimate contact with the solution. When performed in this manner, temperatures below 100° C. are preferred and the effluent gaseous stream comprises wet $H_2S$ and unreacted $CO_2$. The liquid effluent is a slurry containing $BaCO_3$. The degree of solubility of the $BaCO_3$ depends on the partial pressure of the reacting $CO_2$. In such a system the pressure preferably is in the range of from 1 to about 5 atmospheres and the temperature ranges from 20° to 200° C.

The $BaCO_3$ resulting from either of the above carbonation methods is rendered soluble by reaction of a pre-acidified brine or one that is being saturated with $CO_2$ to produce $Ba(HCO_3)_2$ which is utilized as the source of $Ba^{++}$ in step [B] above. It should be recognized that this is a process variation which, in accordance with the discussion under [A] does not require and indeed cannot tolerate prior carbonate removal. The $CO_3^=$ in the brine exists, under these conditions, as a bicarbonate which is in equilibrium with water and $CO_2$, which latter is vented in the course of the reaction. Thus, formation of the competitively insoluble $BaCO_3$ is avoided.

3. Sulfi-Chlorination

In this unit process the BaS is dissolved in a lean, aqueous solution of $Ba(HS)_2$ which is saturated with recycle $H_2S$, to obtain a concentrated solution of $Ba(HS)_2$.

The process combines the above feature with a variant of the oxi-chlorination previously discussed, under heading [F] (1) (a). Briefly, the concentrated $Ba(HS)_2$ solution is reacted in an agitated reactor with an excess e.g. 20 percent) NaCl at a temperature between about 40° C. and 100° C. to produce barium chloride and NaHS in accordance with the equation:

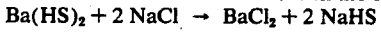
$$Ba(HS)_2 + 2 NaCl \rightarrow BaCl_2 + 2 NaHS$$

The reaction product is subjected to adiabatic evaporation and its temperature thereby reduced to about 0°C., at which point solubility differences permit the withdrawal of a solution of NaHS and the recovery of a precipitate of barium chloride. This precipitate is used as the source of barium for step [B] above.

The NaHS filtrate is then sent to a carbonation column where it is reacted with $CO_2$, resulting in the evolution of $H_2S$ (a portion of which is recycled to saturate the barium sulfide solution), and a sodium bicarbonate product which can easily be converted if desired, to sodium carbonate. The reaction may be represented by the equation:

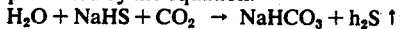
$$H_2O + NaHS + CO_2 \rightarrow NaHCO_3 + H_2S \uparrow$$

Processing of the $NaHCO_3$ for recovery of soda ash is conventional but represents, nonetheless, one of the economic advantages of the instant process.

4. MAGNESIUM REACTION

In this process variation, barium chloride and hydrogen sulfide are produced, directly and simultaneously, from barium sulfide and magnesium chloride by virtue of the double decomposition of magnesium chloride. A saturated aqueous solution of barium sulfide is reacted stoichiometrically with magnesium chloride, at temperatures ranging from 40° to 100° C., in an agitated heated reactor. The solution is refluxed continuously to distill the evolved $H_2S$ and effect the precipitation of magnesium hydroxide. The reaction which occurs, in its totality, can be represented by the equation:

$$BaS + MgCl_2 + 2H_2O \rightarrow BaCl_2 + Mg(OH)_2 + H_2S \uparrow$$

The magnesium hydroxide slurry is stripped of all $H_2S$ and filtered to remove the suspended magnesium hydroxide. The resulting homogeneous aqueous solution of barium chloride is then utilized as the source of barium for step [B]. The magnesium hydroxide product, which has a purity of at least 90 percent, has obvious economic value and may be recovered by any of a variety of conventional methods.

G. ALTERNATIVE TREATMENT OF SULFATE-DEPLETED BRINE

A demetalizing treatment of brine was discussed above (i.e. [F] (1) b) which utilized barium hydroxide. This, however, is not the only method which can be used for recovering metal values from sulfate-depleted brine. Another method can be used in conjunction with the carbonation variant discussed above under the heading [F] (2).

It will be recalled that the carbonation reaction produced a barium bicarbonate solution. This can be fed to a reactor, kept under a positive $CO_2$ pressure, to which is also fed the sulfate-depleted brine or a portion thereof. In this reactor the metallic ions react with the barium bicarbonate to yield a metallic bicarbonate and a soluble barium compound which is utilized as the barium material for step [B] above. For example, in the case of ferric iron the overall reaction may be represented by the equation: $3Ba(HCO_3)_2 + 2FeCl_3 \rightarrow 3BaCl_2 + Fe_2O_3 + 6CO_2 \uparrow + 3H_2O$ Where aluminum is the metal being recovered from the depleted brine, the analogous overall equation would be: $3Ba(HCO_3)_2 + 2AlCl_3 \rightarrow 3BaCl_2 + Al_2O_3 + 6CO_2 \uparrow + 3H_2O$.

Other variants are also possible. For example, the metal recovery can be made part and parcel of the total treatment process and the brine handled on a "once-through" basis. In such a variant, particularly useful for brines of a highly acidic nature, (e.g. a pH of less than 6) substantially all of the brine is contacted with bicarbonate solution and the pH adjusted to a level which, while permitting precipitation of barium sulfate, keeps the metal in solution. When this solution is, thereafter, aerated for degassification of $CO_2$, the metals will then precipitate in the form of the oxide or hydroxide. These can be processed, separated if necessary one from the other, and recovered.

Many other variants within the scope of the invention will be apparent to those skilled in the art having before them the two fundamental tools of metal recovery, namely, the use of the barium hydroxide produced in the hydrolysis process and the use of the barium bicarbonate produced in the carbonation process.

BRIEF DESCRIPTION OF THE DRAWING

In the drawing, wherein like reference numerals designate like features.

DESCRIPTION OF THE PREFERRED EMBODIMENTS

Figure 1:
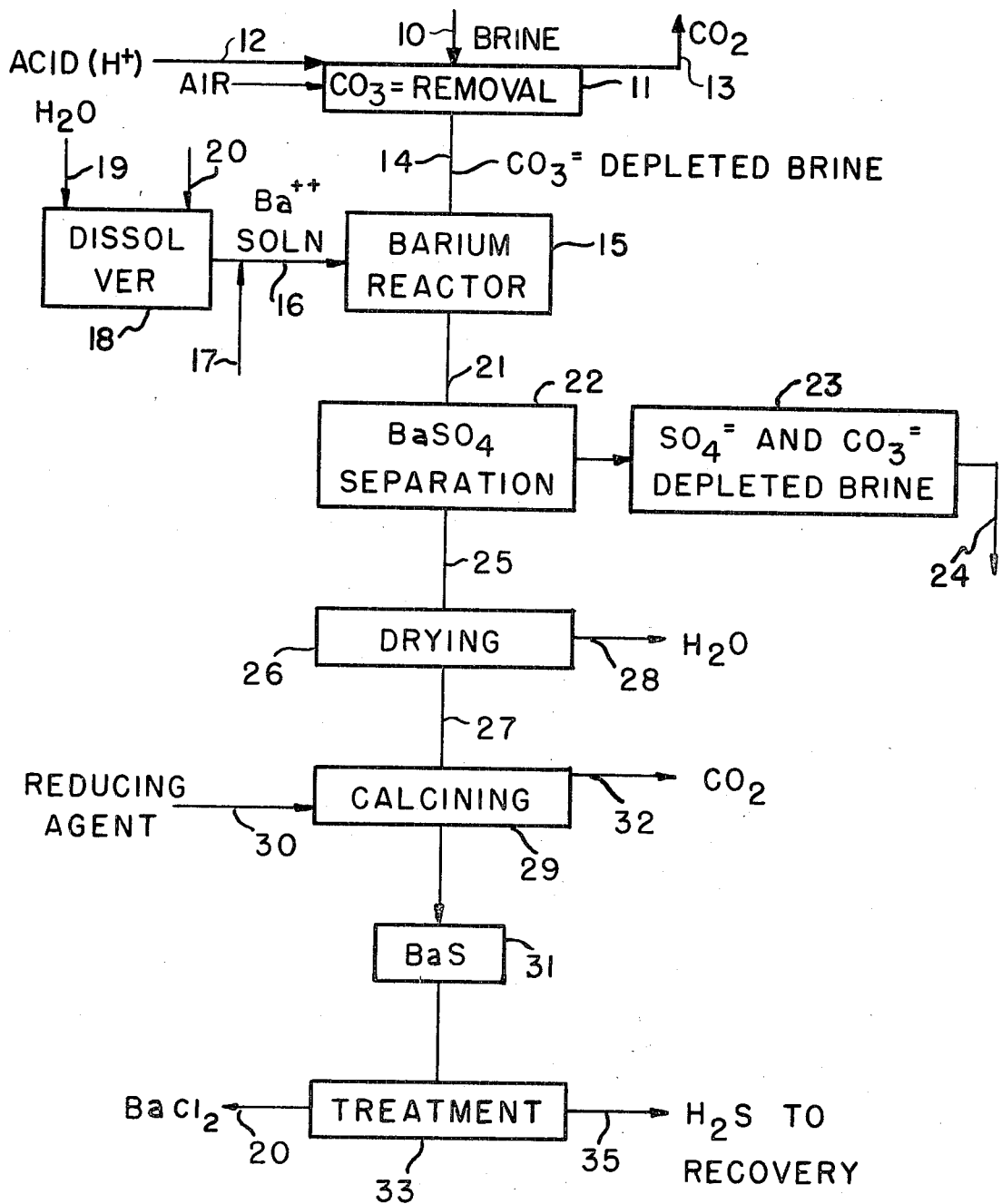
FIG. 1 is a generalized flow diagram representative of the broadest aspect of the invention.

Referring now to FIG. 1, the following is a description of the preferred embodiments.

One-million pounds of brine 10 containing 1,920 pounds of sulfate ion and 1,216 pounds of magnesium ion are fed to the decarbonator 11 where sufficient mineral acid 12 is added to adjust the pH to a value of about 5. Following removal of carbon dioxide the carbonate-depleted brine 14 is fed to barium reactor 15 where sufficient recycle barium ion 16 is added for a stoichiometric reaction with the sulfate ion. The barium ion, depending on its source, enters the reactor directly, via line 17, or is mixed in a dissolver 18 from water 19 and a solid brine-soluble barium compound 20 selected from the group consisting of barium chloride, barium hydroxide and barium bicarbonate. A barium sulfate slurry 21 results which is fed to separator generally 22 comprising a clarifier (which yields a sulfate-depleted brine 23, disposed of through line 24) and a barium sulfate cake containing about 60 percent moisture. This cake, as a continued part of the separation operation, is centrifuged to a moisture content of about 20 percent. The cake 25 is dried and pelletized in dryer 26 to yield pelletized barium sulfate 27, having a moisture content of about 5 percent the water having been removed via line 28. These pellets are preheated to a temperature of about 1,100° C. and then fed into calciner 29 where they are reacted with preheated synthesis gas 30 to form barium sulfide 31 and release $CO_2$ through line 32. About 3,200 pounds of barium sulfide result which represent about 95 percent recovery of the sulfate values from the brine. Subsequent treatment 33, yields the recycle barium values (e.g. barium chloride 20) and $H_2S$ 35 as will be more particularly described below.

Figure 2:
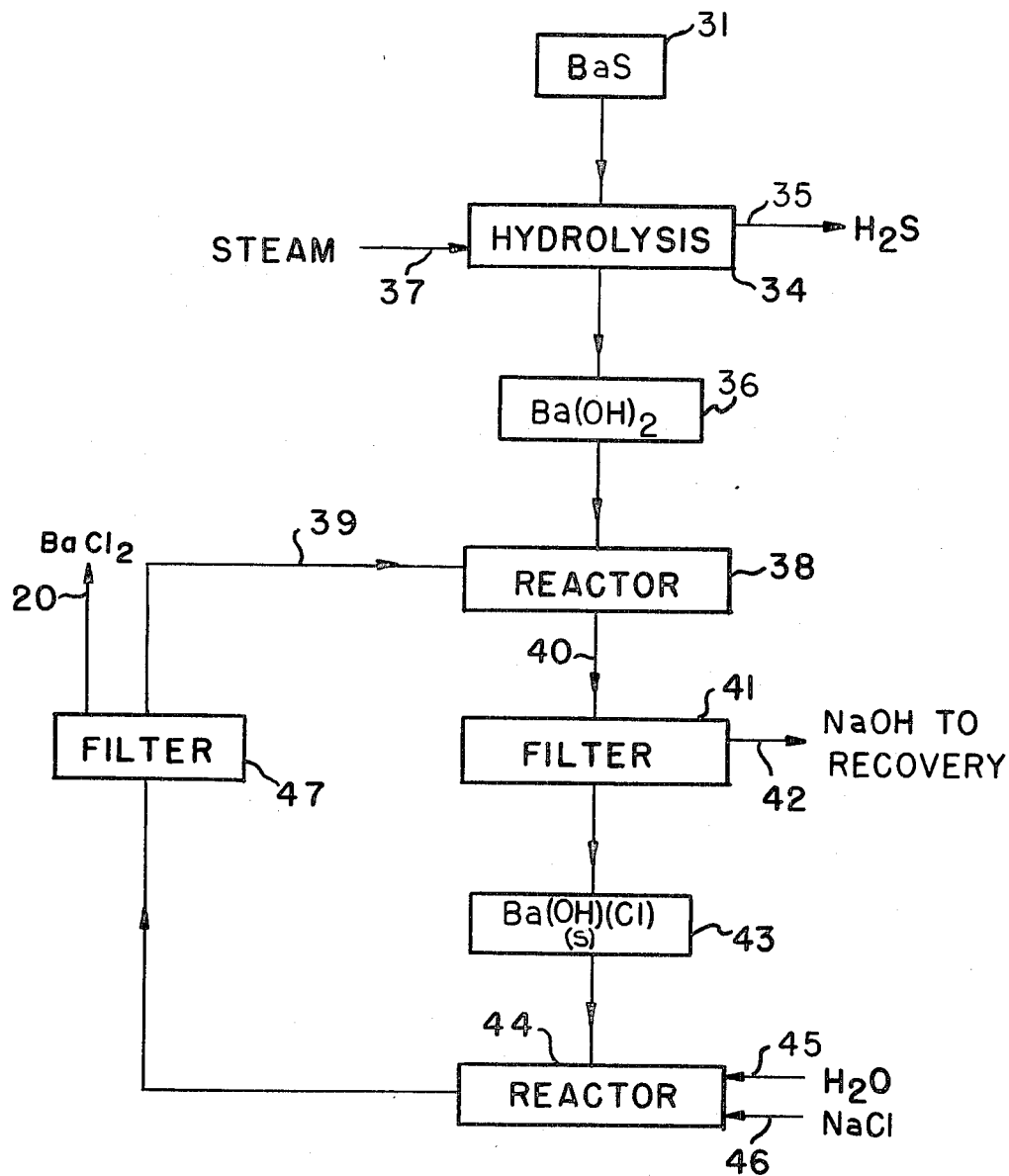
FIG. 2 is a flow diagram of a first hydrolysis modification of the invention, namely the oxi-chlorination variant.

Referring now to the modification shown in FIG. 2, the barium sulfide 31, previously recovered, is hydrolyzed in a fluidized bed reactor 34 with steam 37 containing up to 10 percent $H_2$ and, from the reactor, is withdrawn its stoichiometric equivalent in the form of barium hydroxide 36. The evolved $H_2S$ is sent via conduit 35 to a conventional recovery unit where it is processed to yield elemental sulfur or is converted to $H_2SO_4$. The solid $Ba(OH)_2$ constitutes the feed to the oxi-chlorination unit where it is fed to the prime reactor 38. Also to this reactor, via line 39, is fed a recycle solution of sodium hydroxide and barium chloride. The feed is adjusted so that the total $OH^-$ and $Ba^{++}$ are in a 3:2 ratio with the $Cl^-$ and $Na^+$, respectively. The effluent 40 from the prime reactor is a slurry containing $Ba(OH)(Cl)$ and sodium hydroxide, the former being the reaction product. This slurry is fed to filter 41 and the filtrate 42, rich in sodium hydroxide, is fed to a conventional sodium hydroxide recovery unit. The solid $Ba(OH)(Cl)$ 43 is fed to secondary reactor 44 which also receives a stream of make-up water 45 and sodium chloride 46. The reaction which occurs results in the formation of a slurry containing about 6,000 pounds of barium chloride in a crude caustic solution. This slurry is fed to filter 47 where the filtrate is separated and returned to primary reactor 38 via line 39. That barium chloride not required stoichiometrically for reaction with the barium hydroxide, in the approximate amount of about 3,800 pounds, is forwarded to reactor 15 [FIG. 1]to supply the barium values required for another cycle of sulfate extraction.

Figure 3:
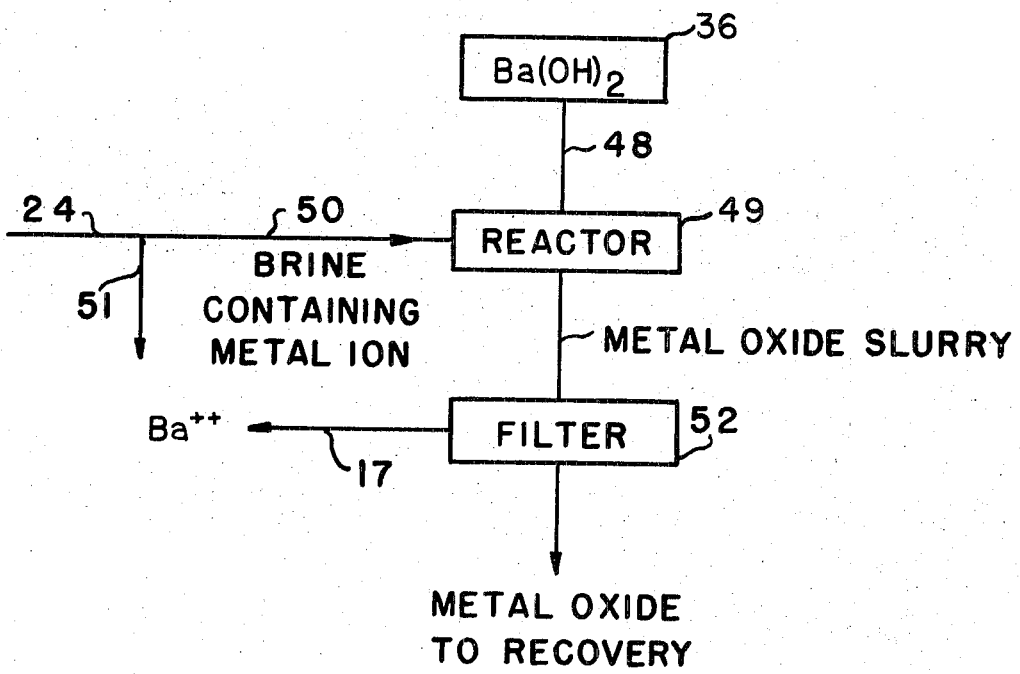
FIG. 3 is a flow diagram of a second hydrolysis modification of the invention, namely the oxi-demetalizing variant.

Referring now to FIG. 3, which represents the oxi-demetalizing embodiment of the invention, an alternative to that shown in FIG. 2, the barium hydroxide hydrolysis product 36 is fed through conduit 48 into a reactor 49 where it is contacted with a portion of the sulfate-depleted brine 24 - which enters via conduit 50, the undesired balance being disposed of via line 51. The amount of depleted brine used in the reaction is varied depending upon the characteristic of the brine being used. For example, in the case of sea water, about 50 percent of the sulfate-depleted brine can be fed to the oxi-demetalizing. In the example given herein (i.e. a 5:2 ratio of magnesium to sulfate in the original brine) about 40 percent is recycled through line 50. The slurry which results from the reaction contains magnesium hydroxide in an amount stoichiometrically equivalent to the barium hydroxide fed. Upon filtration in the filter 52, the metal oxide is separated and sent to a metal oxide recovery unit. The filtrate containing the barium values, predominantly in the form of barium chloride, is returned, via conduit 17 to reactor 15 as shown in FIG. 1. The quantity of $Mg(OH)_2$ produced in this embodiment, expressed as the oxide, is about 1,200 pounds.

Figure 4:
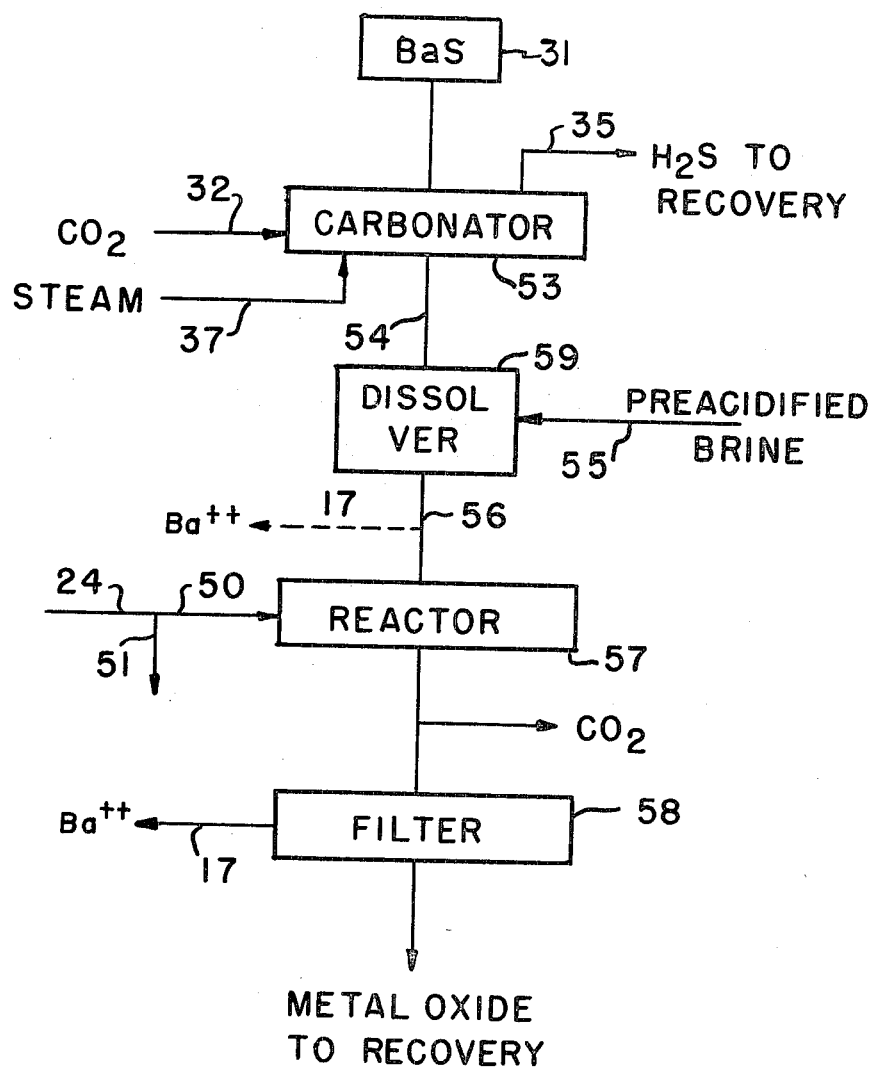
FIG. 4 is a generalized flow diagram of another modification of the invention, namely one utilizing carbonation.

Referring now to FIG. 4 the carbonation embodiment of the process will be discussed. 3,200 pounds of barium sulfide 31, the product coming out of calciner 29, are fed to a fluidized bed carbonator 53 wherein the fluidizing gas is a mixture of $CO_2$ 32, coming from the calciner, and steam. The evolved $H_2S$ is sent, by a conduit 35 to a conventional recovery unit where it may be processed to yield elemental sulfur or converted to sulfuric acid. The effluent from the fluidized bed carbonator 53 is water-immiscible solid barium carbonate 54. It is rendered soluble by contacting it with a preacidified brine (pH less than 6) 55 in dissolver 59 to produce a solution of barium bicarbonate in accordance with the equation:

$$BaCO_3 + CO_2 + H_2O_{(1)\ H+} \rightarrow Ba(HCO_3)_2$$

This barium bicarbonate solution 56 is forwarded, if desired, via conduit 17 to reactor 15, as shown in FIG. 1.

Where, as in this embodiment, barium bicarbonate is used as the source of barium values, the pretreatment step shown in FIG. 1 is omitted and the untreated brine is fed directly into reactor 15 via conduit 14. The reactor 15 is operated under positive $CO_2$ pressure (using for example $CO_2$ from the calciner) to prevent the decomposition of the unreacted barium bicarbonate. Following the precipitation of $BaSO_4$, provision is made for stripping the $CO_2$ as part of the $BaSO_4$ operation.

Instead of utilizing the barium bicarbonate directly, per se, for supplying the barium values to reactor 15 it can be subjected to the demetalizing treatment also shown in FIG. 4. Here the objective is to recover metal oxide values from sulfate-depleted brine and to return the barium values to the process, predominantly in the form of barium chloride via conduit 17 to reactor 15, as shown in FIG. 1.

In order to accomplish this, barium bicarbonate solution 56 is fed to reactor 57. A portion of the sulfate-depleted brine is also fed to the reactor via conduit 50 and this brine contains the metal values to be recovered. Finally, the reactor effluent is stripped of carbon dioxide to neutralize the solution, thus effecting the salting out of the metal oxide that was produced by double decomposition, in accordance with the equations discussed above. The quantity of sulfate-depleted brine which can be fed to the reactor is a function of the quantity of barium bicarbonate being fed and of the metal content of the brine. The constraint of the reaction is that the bicarbonate be stoichiometrically equivalent to the sulfate ions. The resulting slurry is fed to filter 58 where metal oxide is separated and sent to a recovery process and the filtrate, which is essentially a solution of a soluble barium compound in a brine which has been both sulfate and metal depleted, is returned to reactor 15 of FIG. 1 via conduit 17.

Figure 5:
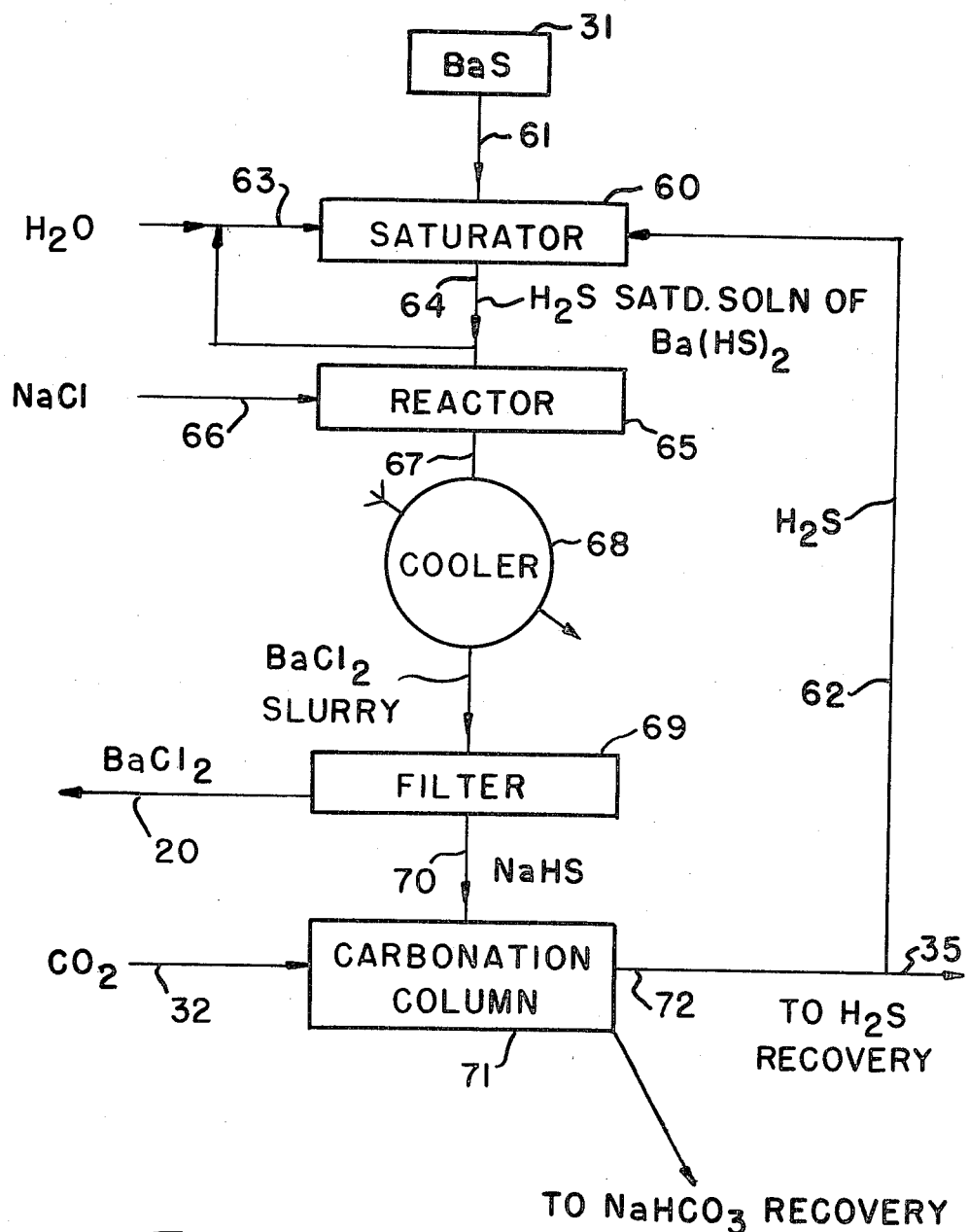
FIG. 5 is a generalized flow diagram of still another embodiment of the invention, this one being the sulfichlorination modification.

Referring now to FIG. 5, it will be observed that 3,200 pounds of barium sulfide 31 are fed to a sulfi-chlorination process. The feed enters saturator 60 via line 61 and gaseous $H_2S$ is also fed via conduit 62. A dilute recycle solution of water and $Ba(HS)_2$ is fed in through line 63 and, after saturation, a concentrated solution of barium hydrosulfide is withdrawn via line 64, a portion being used for recycle. The $Ba(HS)_2$ concentration is temperature-related but in this embodiment approximates 35 percent by weight. An operating range of about 40° to about 100° C. is preferred.

This solution is fed to reactor 65, to which sodium chloride 66 is added. The reaction product, a suspension of barium chloride in an aqueous solution of NaHS is removed via line 67. The solution is passed through a cooler 68 to reduce its temperature to approximately 0° C. and thus complete the precipitation of $BaCl_2$. Chilled slurry is fed to filter 69 where the barium chloride is removed and forwarded to the dissolver 18 (FIG. 1). The filtrate, substantially an aqueous solution of NaHS, flows through line 70 to carbonation column 71. This column is a continuous liquid-gas contactor wherein the gas is $CO_2$ obtained from the calciner via line 32. In the carbonation column, continuous contact between the NaHS filtrate and carbon dioxide is effected, thus causing the evolution of $H_2S$ and the formation of sodium bicarbonate, which is sent to a recovery unit for purification and recovery. The $H_2S$ leaves the column via line 72 and is split between the saturator demand for recycle $H_2S$, to satisfy which a portion of the evolved gas is shunted through line 62 and the balance of the evolved gas goes via line 35 to an $H_2S$ recovery plant. The sulfur sent to the recovery plant in the form of $H_2S$ is close to 90 percent of the stoichiometric equivalent of the sulfur contained in the 3,200 pounds of barium sulfide.

Figure 6:
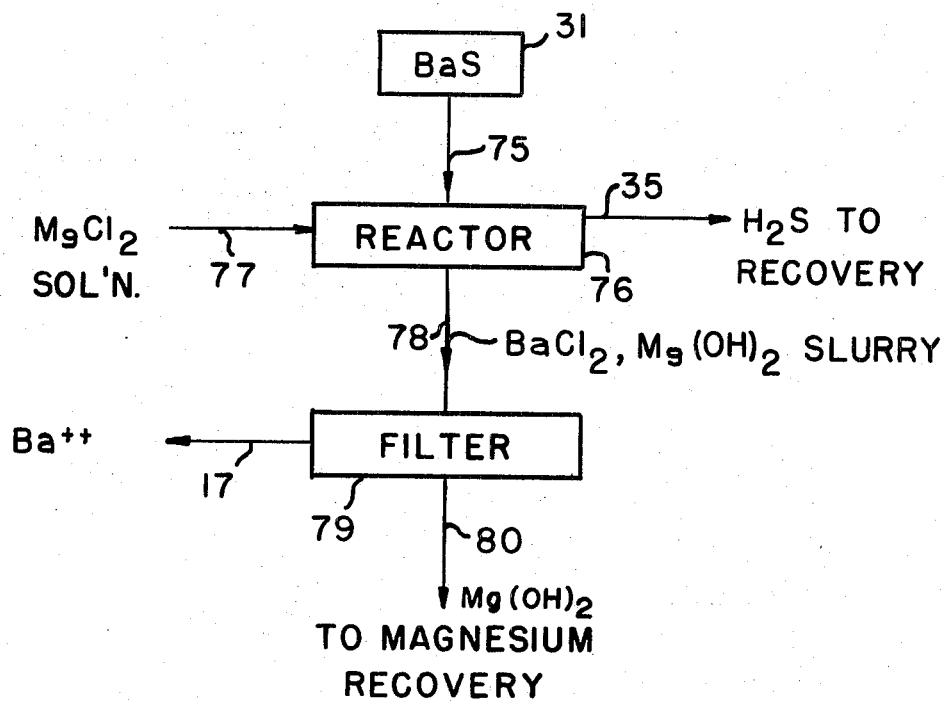
FIG. 6 is a flow diagram of an additional modification of the invention the magnesium reaction variant.

Referring now to FIG. 6, 3,200 pounds of barium sulfide are fed to a de-magnizing unit through conduit 75. The feed enters reactor 76, which is provided with a heat source, capable of boiling the contents thereof, and a reflux condenser. To this reactor, via line 77, is added an aqueous solution of magnesium chloride which is preferably preheated to a temperature of approximately 90° C. The $H_2S$ which is evolved during the reaction is removed via overhead line 35 and sent to an $H_2S$ recovery unit. The reaction product which is a slurry of magnesium hydroxide suspended in aqueous barium chloride is fed to filter 79 via line 78. In the filter the magnesium hydroxide precipitate is removed and sent, via line 80, to a magnesium recovery plant. The filtrate, which is an aqueous barium chloride solution, leaves the filter via line 17 and is sent to the barium reactor 15 shown in FIG. 1. The process yields upwards of 95 percent of the sulfur contained in the BaS as $H_2S$. Further, it will be noted that the process effects the conversion of magnesium chloride to magnesium hydroxide.

Two metal recovery processes have been previously described, one (shown in FIG. 3) in connection with the hydrolysis operation (i.e. oxi-demetalizing) and the other (shown in FIG. 4) in connection with the carbonation reaction (i.e. carbo-demetalizing). It has also been found that for certain brines, particularly those containing iron and aluminum, recovery of metal values can be best effected by treating the totality of the brine with barium bicarbonate, such as may be obtained in the carbonation process discussed in conjunction with FIG. 4. The key to the reaction is to first contact barium bicarbonate with brine, under conditions which will precipitate all sulfate ions solely as barium sulfate and, thereafter, decompose the metal bicarbonate and effect the precipitation of the metal oxide.

Figure 7:
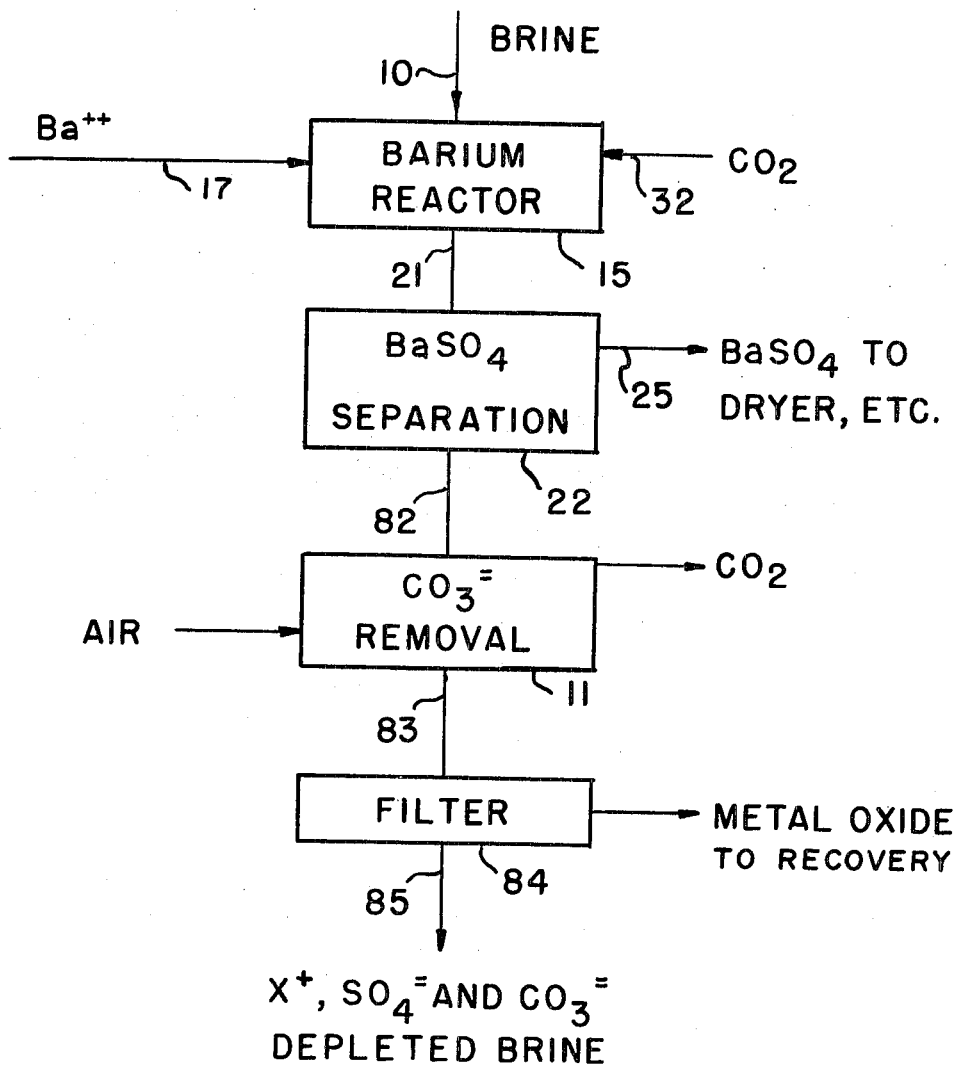
FIG. 7 represents a flow diagram of a first once-through process for recovery of metals from sulfate-depleted brine.

As shown in FIG. 7, brine 10 is fed to reactor 15 as is barium bicarbonate from line 17 of FIG. 4. The reactor 15 is then operated under positive $CO_2$ pressure (using, for example, $CO_2$ from the calciner) to prevent the decomposition of the unreacted barium bicarbonate. Under these conditions barium sulfate will preferentially precipitate whereas the metal bicarbonates will remain in solution. The slurry leaves the reactor through line 21 and is thereby transfered to separatory apparatus 22 from which a barium sulfate concentrate is removed via line 25. The remaining solution is transferred via line 82 to a decarbonation chamber 11 where the $CO_2$ is stripped with air, thus effecting the production and precipitation of the metal oxides. The stripped slurry is fed via line 83 to filter 84 where the metal oxide is removed for subsequent recovery and the metal, sulfate and carbonate depleted brine filtrate is disposed of via conduit 85.

It is believed that the above disclosure will not only enable those skilled in the art to practice the invention but also to make modifications and changes therein, including use of permutations not specifically discussed, all of which are the equivalent of the illustrative preferred embodiments. Accordingly, the true scope and spirit of the invention is embraced by the appended claims.

I claim:

1. A process for recovering sulfur values from brine comprising:
    a. directly reacting a brine containing $SO_4^=$ and at least one metal selected from the group consisting of copper, iron, aluminum, calcium, magnesium and strontium, with an inorganic barium compound, soluble in said brine, selected from the group consisting of bicarbonate, hydroxide and chloride, at a pH of less than 6, to obtain a precipitate comprising $BaSO_4$ and a depleted brine;
    b. separating said $BaSO_4$ from the depleted brine;
    c. drying said $BaSO_4$;
    d. calcining said $BaSO_4$, in a reducing atmosphere, to effect its conversion to BaS;
    e. treating said BaS, as such, to displace the sulfur therein as $H_2S$, and to convert barium to an inorganic compound selected from the group consisting of bicarbonate, hydroxide and chloride.

f. recovering said $H_2S$; and g. reutilizing the Ba portion of said BaS as the brine-soluble barium reactant in step (a).

2. The process of claim 1 wherein, further, at least a portion of the depleted brine remaining after step (b) is reacted with barium hydroxide to yield a metal hydroxide or with barium bicarbonate to yield a metal oxide, the metallic portion of said compounds being derived from a metal originally present in the brine and, thereafter, returning the mother liquor to step (a) to supply the barium required therein.

3. The process of claim 2 as applied to a brine containing magnesium, wherein the barium compound added to the depleted brine is $Ba(OH)_2$ and the metallic compound precipitated is $Mg(OH)_2$.

4. The process of claim 2, as applied to a brine containing iron, where the barium compound added to the depleted brine is $Ba(OH)_2$ and the metallic compound is an hydroxide of iron.

5. The process of claim 1 wherein the treatment of step (e) comprises reacting BaS with $MgCl_2$ in boiling aqueous medium, to evolve $H_2S$ and precipitate $Mg(OH)_2$ from the thus-formed solution of $BaCl_2$ and, thereafter, utilizing said $BaCl_2$ solution as a source of barium for step (a).

6. The process of claim 1 wherein the treatment of step (e) is achieved by hydrolysis and wherein, further, the barium product of said hydrolysis is recovered.

7. The process of claim 1 wherein the treatment of step (e) comprises the steps of:

h. hydrolysis of BaS to yield $Ba(OH)_2$;

i. reacting process-derived barium hydroxy chloride with an aqueous solution of an alkali metal chloride to yield a precipitate of $BaCl_2$ and a solution containing $BaCl_2$ and a metal hydroxide;

j. separating said $BaCl_2$ precipitate and using it as the source of the barium required in step (a);

k. reacting said barium hydroxide from step (h) with said solution from step (i) to yield the aforesaid process-derived barium hydroxy chloride and a solution of alkali metal hydroxide, from which latter solution said alkali metal hydroxide is subsequently recoverable.

8. The process of claim 1 wherein the treatment of step (e) is achieved by carbonation of BaS with $CO_2$ and wherein the barium product of said carbonation is utilized as the source of the barium required in step (a).

9. The process of claim 1 wherein the treatment of step (e) comprises the steps of:

h. dissolving said BaS in water, saturated with $H_2S$, to yield an aqueous solution of $Ba(HS)_2$;

i. reacting said $Ba(HS)_2$ solution with an excess of an alkali metal chloride to precipitate $BaCl_2$;

j. carbonating the mother liquor with $CO_2$ to release $H_2S$ and form $Na(HCO_3)$ and k. recycling a portion of the $H_2S$ released to saturate the solution of step (h).

* * * * *